United States Patent [19]

Foucras et al.

[11] 4,165,082
[45] Aug. 21, 1979

[54] LEAKPROOF SECURING MEANS FOR MOUNTING A SEMI-PERMEABLE MEMBRANE TO A SUPPORT

[75] Inventors: Jacques Foucras, Bron; Georges Rodet, Communay, both of France

[73] Assignee: Rhone-Poulenc Industries, Paris, France

[21] Appl. No.: 910,765

[22] Filed: May 30, 1978

[30] Foreign Application Priority Data

Jun. 2, 1977 [FR] France .................. 77 17472

[51] Int. Cl.² .............. B01D 25/26; F16J 15/06
[52] U.S. Cl. ................................ 277/166; 277/9; 277/12; 210/232; 210/321 R
[58] Field of Search ............... 277/9, 11, 12, 110–112, 277/117, 118, 119, 166, 116.4, 237 R, 168, 189, 198; 210/232, 321 R, 346, 433 M, 450, 542

[56] References Cited

U.S. PATENT DOCUMENTS

| Re. 12,588 | 1/1907 | Kiefer | 210/346 |
| 3,231,288 | 1/1966 | Hensien | 277/166 |
| 3,809,246 | 5/1974 | Niogret | 210/232 |
| 3,831,763 | 8/1974 | Breysse et al. | 210/346 X |
| 3,872,015 | 3/1975 | Madsen | 210/346 X |
| 3,979,298 | 9/1976 | Breysse et al. | 210/232 |
| 3,980,564 | 9/1976 | Bardin et al. | 210/321 R |
| 4,019,987 | 4/1977 | Krasnow | 210/232 |

FOREIGN PATENT DOCUMENTS

| 2127155 | 10/1972 | France | 210/321 R |
| 2141417 | 1/1973 | France | 210/321 R |
| 2165042 | 8/1973 | France | 210/232 |
| 606750 | 8/1948 | United Kingdom | 210/321 R |

Primary Examiner—Robert S. Ward, Jr.
Attorney, Agent, or Firm—Bacon & Thomas

[57] ABSTRACT

A support plate has fluid-flow openings therethrough which openings are flared at their ends. Securing rings extend into the openings from opposite ends and have tapered lips firmly pressing the edges of membranes against the flared end surfaces of openings. The rings are fixed to each other to exert constant pressure on the membrane edges.

19 Claims, 10 Drawing Figures

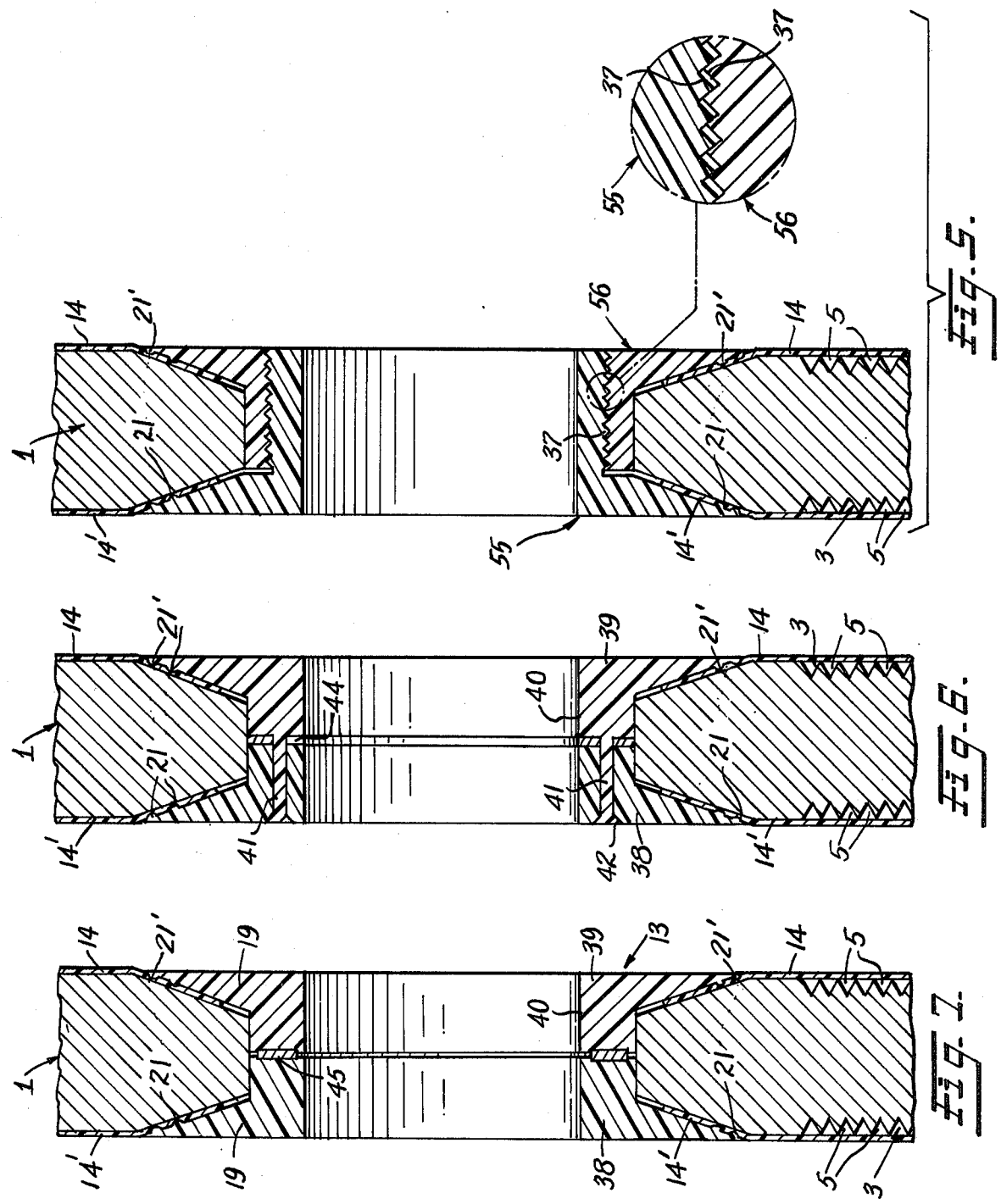

LEAKPROOF SECURING MEANS FOR MOUNTING A SEMI-PERMEABLE MEMBRANE TO A SUPPORT

BACKGROUND OF THE INVENTION

The present invention relates to a device for the leaktight attachment of semi-permeable membranes to support plates of an apparatus which separates by selective permeability.

Apparatuses which separate fluid by selective permeability are known, especially from French Pat. No. 2,127,155 and its Certificate of Addition No. 2,141,417. These apparatuses comprise sub-units which are formed, in particular, by the juxtaposition of a number of membrane support plates, the pressurized fluid to be treated, which is generally liquid, circulating in parallel between the membranes of the successive support plates (of one sub-unit), which are provided with, generally elongated, orifices towards each of their ends, for the passage of the fluid, while this fluid circulates in series from one sub-unit to the other due to the presence of so-called intermediate plates which only have an orifice towards one of their ends. When it has passed through the membranes, the fluid is recovered individually for each support plate on the edge of the latter.

French Pat. No. 2,165,042 has proposed a solution for keeping the membranes leaktight near the orifices, for the passage of the fluid to be treated, of each support plate. This solution consists in keeping the transverse ends of the membrane in an elongated opening, which is close to the orifice for the passage of the fluid to be treated, by means of a detachable device which keeps the membrane leaktight on the inner wall of this opening. It has been shown that, under certain conditions of use of the apparatus, and especially for high circulation rates of the fluid to be treated, this detachable device can advantageously be replaced by a device, which is preferably of circular shape, the fluid to be treated circulating at the center thereof. Such a device for the leakproof attachment of membranes to a support plate is already known, but it exhibits the disadvantage that it is not itself fixed to a support plate, which requires that the adjacent devices of two consecutive support plates be held in contact with one another, for example, by means of cams or peripheral ridges, in which case the membranes are only kept leaktight on the support plates when the apparatus is tightened up. This embodiment of the membrane fixing device, therefore, only makes it possible to ensure the leaktight attachment of the membranes to each opposite face and around the orifice, for the passage of the fluid to be treated, of a support plate when the apparatus itself is tightened up. This embodiment of the attaching devices, therefore, exhibits the disadvantage that it renders the leaktightness of the membranes on each support plate dependent on the tightening-up of the apparatus itself, which tightening-up must also make it possible to ensure the peripheral leaktightness between two consecutive membrane support plates.

SUMMARY OF THE INVENTION

The aim of the present invention is to provide a device for the leaktight attachment of membranes to each support plate of an apparatus which separates by selective permeability, this device not exhibiting the disadvantages of the devices of the prior art.

The present invention relates to a device for the leaktight attachment of semi-permeable membranes onto each opposite face and around each orifice provided for the passage of the fluid to be treated, of a membrane support plate in an apparatus which separates by selective permeability and comprises, in particular, support plates having, towards each of their ends, at least one orifice for the passage of the fluid to be treated, the said device being characterized in that it comprises two rings which are fixed to one another, after they have been arranged in the orifice of the support plate, by bringing them together axially until the edge of each of them presses the membrane in a leaktight manner against each face of the said support plate.

BRIEF DESCRIPTION OF THE DRAWINGS

The description of the device according to the present invention will be better understood by reference to drawings which illustrate schematically, by way of non-limiting examples and with no fixed scale, particular embodiments of the said device.

FIGS. 3A and 3B are sectional views of the rings before mounting on the support plate;

FIGS. 5, 6, 7 and 8 show different embodiments of devices embodying the present invention.

DESCRIPTION OF THE PREFERRED EMBODIMENTS

Figures 1, 2:
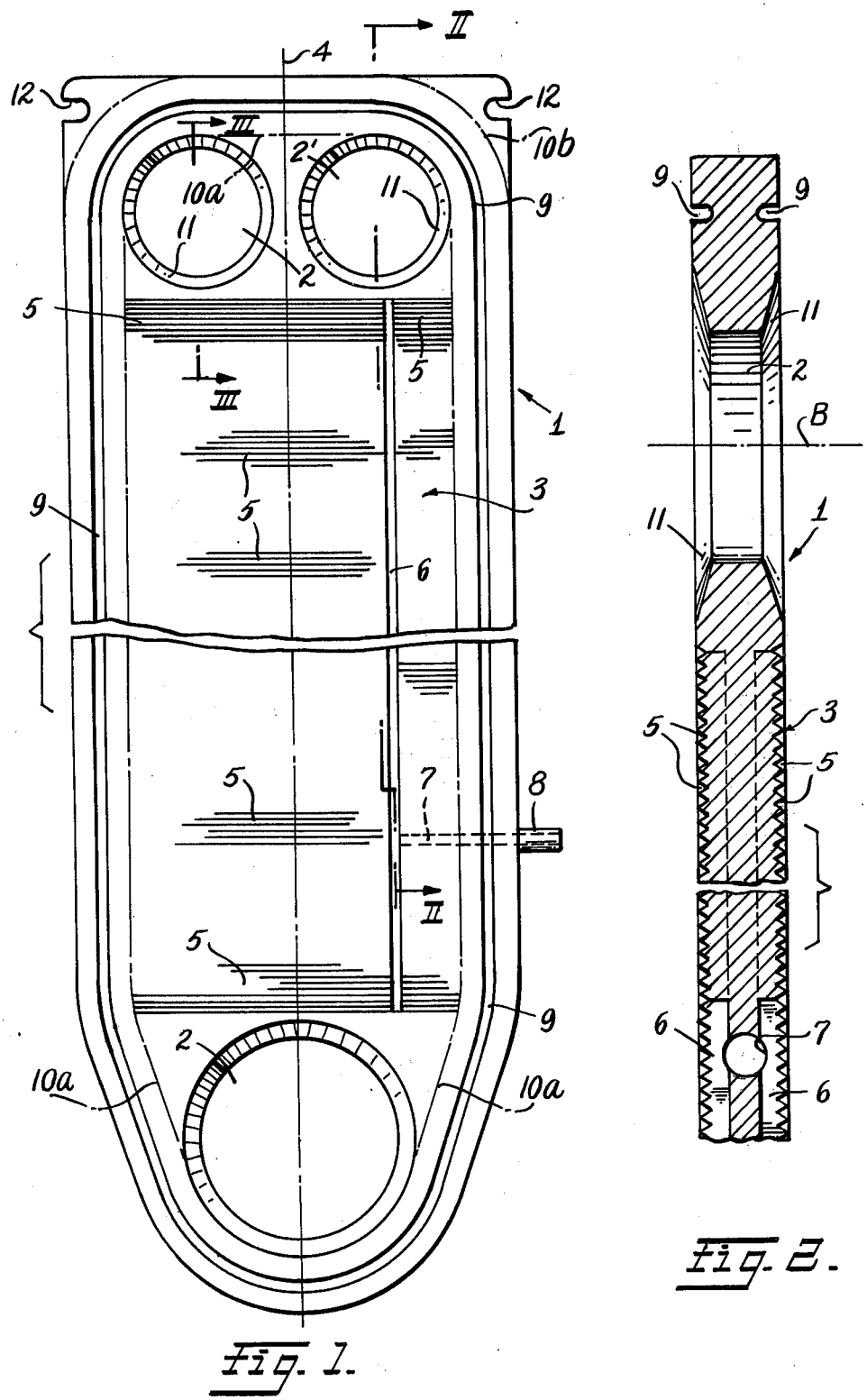
FIG. 1 shows a membrane support plate which can be equipped with the device according to the present invention.
FIG. 2 is a sectional view taken along II—II of FIG. 1.

A support plate, onto which the devices according to the present invention can fix the membranes in a leaktight manner, is shown, in part, in FIGS. 1 and 2 by way of example. A plate, which is generally of elongated shape, has adjacent each of its ends, at least one orifice for the passage of the fluid to be treated. In the case of FIG. 1, the plate 1 possesses two orifices 2 and 2' in its upper part, whereas it has only one orifice 2" in its lower part. The support plates which can be equipped with the devices according to the present invention can, of course, have the same number of orifices at each end. Between the orifices 2 2' and 2" there is a basin 3 or zone, having channels 5 which are perpendicular to the longitudinal axis 4 of the support plate 1 and the cross-section of each of which is generally triangular, as shown in FIG. 2. The channels 5 of each basin 3 are covered by a membrane and are for the circulation of the fluid, generally a liquid, which has passed through the semi-permeable membranes. The fluid is collected in each basin 3 by means of at least one longitudinal groove 6 in communication with each channel, each groove 6 also being in communication with a passage 7, inside the plate 1, which makes it possible to evacuate the said fluid to the outside of the said plate 1, for example, by means of the pipe 8. As described in Certificate of Addition No. 2,141,417, two adjacent support plates 1 are preferably spaced apart from one another by means of a gasket which ensures both the peripheral seal between two adjacent plates and the thickness, between the membranes of two plates, of the layer of fluid to be treated. The support plate 1 shown in FIGS. 1 and 2 has, on each of its faces, a peripheral groove 9, which is optionally discontinuous, in which a ridge provided on the gasket separating two support plates is positioned; this ensures a better positioning and a better resistance of the gasket to the action of the fluid to be treated, which circulates under pressure in the apparatus. A gasket is not shown in FIG. 1, but the broken lines 10a and 10b show its outline and positioning on the plate, the outer contour of a gasket thus having essentially the same outline as that of the plate (line 10b), while its inner contour essentially corresponds to the width of the basin and passes (line 10a) near the orifices 2 2' and 2''. On a support plate such as that shown in FIGS. 1 and 2, the membrane (not shown) has a contour which essentially corresponds to that of the groove 9 and openings which correspond to the orifices 2 2' and 2'' for the passage of the fluid to be treated. In general, the membranes are cut in such a way that, near the orifices, they rest on the face 11 of a peripheral flared portion which is provided on each face of the support plate. The notches 12, provided in the upper part of the support plate 1 comprise means for holding the said plates which are generally used in the vertical position in an apparatus, the pipe 8 for evacuating the fluid which has passed through the membranes being located towards the lower part of each support plate. The support plate 1 described above corresponds to a preferred embodiment of such a plate which can be equipped with the device according to the present invention. In this embodiment of the support plate 1, the membrane is thus essentially always in the same plane, especially over the basin 3 and over the periphery of the plate. However, in certain cases, it is possible for two adjacent support plates not to be separated by a gasket, it being possible for the latter to then be replaced by a peripheral ridge provided on at least one of the two consecutive plates. However, this embodiment of the support plates exhibits the disadvantage that at least one of the two membranes enclosed between two adjacent support plates is not in the same plane over the basin 3 and towards the periphery of the plate; this can cause folds in the membrane which make it more difficult to obtain a tight seal between two adjacent plates and may create poorly irrigated dead zones towards the periphery of the membranes. Furthermore, this embodiment of the plates can cause local stretching of the membrane near the peripheral ridges holding the membrane.

Likewise, it must be pointed out that the basin 3, referred to above, comprises a particularly advantageous embodiment when using semi-permeable membranes having good mechanical strength, for example, membranes supported by a net or non-woven material. However, in the case of more fragile membranes, provision can be made for them to rest not directly on the channels 5 but, for example, on a porous support. The depth of the basin provided is so chosen that the face of the porous support on which the membrane rests is in the same plane as that of the periphery of the basin.

As regards the orifices 2 2' and 2'' of the plate 1, they have been shown as having a circular shape, this corresponding to a preferred embodiment. However, these orifices can optionally be elliptical or have other shapes, for example, a square or rectangular shape with rounded corners.

Figure 3:
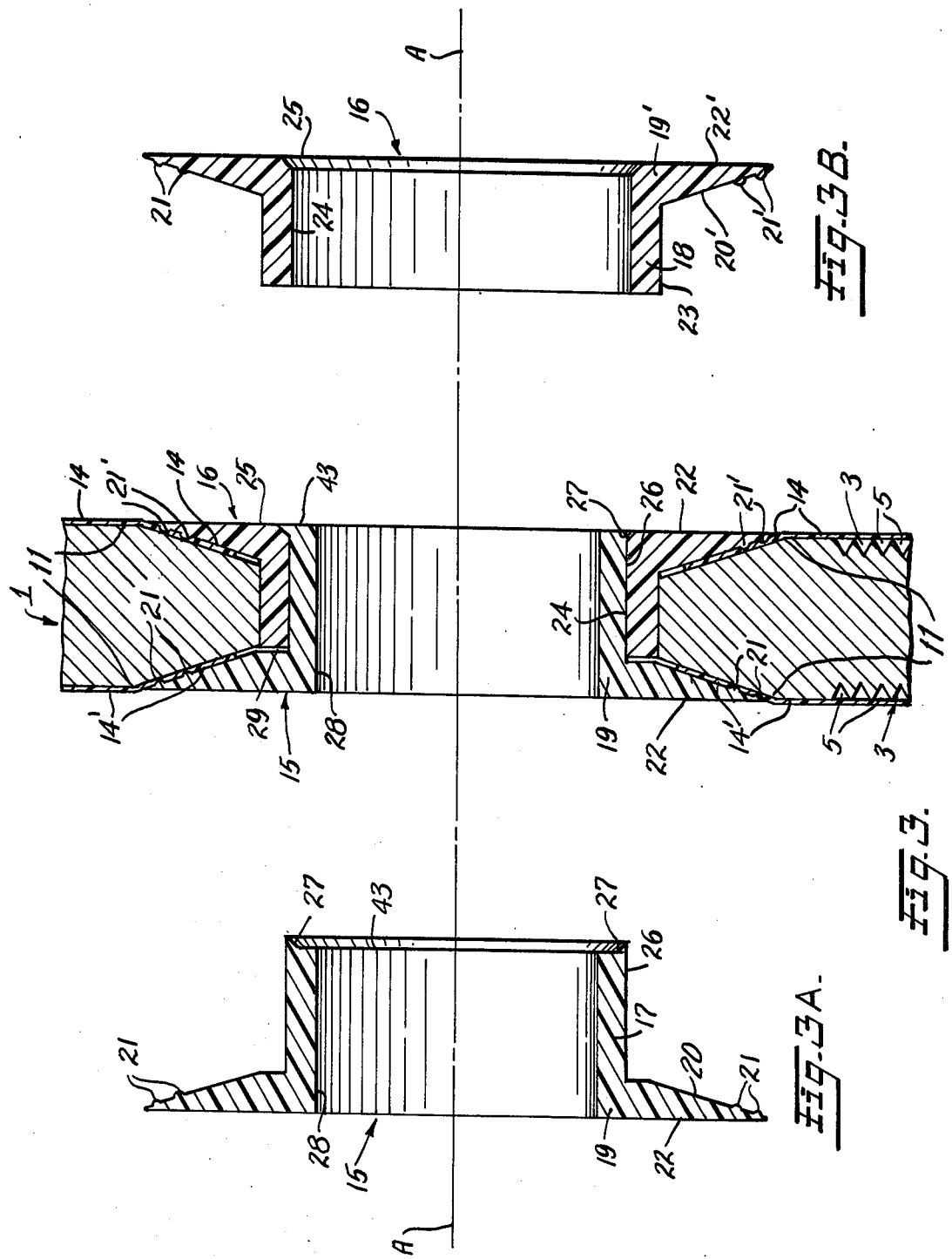
FIG. 3 is a view in section of a device according to the present invention, in position on a support plate which is seen in section along III—III of FIG. 1.

FIGS. 3, 3A and 3B show a preferred embodiment of a device for the leaktight attachment of semi-permeable membranes 14 and 14' to each face of a support plate 1 as described previously. This device comprises a male ring 15 and a female ring 16 which are fitted together, the one inside the other, in orifice 2 2' or 2'' of the support plate 1. The male ring 15 is shown in FIG. 3A and the female ring 16 is shown in FIG. 3B, before they are placed on the support plate 1. These two rings 15 and 16 are of circular cross-section. They each comprise a cylindrical part 17 and 18 and a peripheral edge 19 and 19'. The inner face 20 20' of the edge 19 and 19' of each ring defines at least one peripheral ridge 21 and 21', of the "thin continuous rib" kind, which presses the membranes 14 and 14' onto the faces 11 of the flared portions of the support plate 1 when they are fixed to the latter. These inner faces 20 and 20' of the peripheral edges form, together with a plane perpendicular to the axis A of each ring 15 and 16, an angle which is less than that between the face 11 of the flared portion of the support plate 1 and a plane perpendicular to the axis B of the orifice 2. The axes A and B generally coincide when the device is mounted on a support plate. This difference in angle can thus be between 0.5 and 5 degrees, and preferably between 1 and 3 degrees. The rings 15 and 16 are designed (as is clearly seen in FIG. 3) in such a way that, after they have been fixed on a support plate 1, the outer faces 22 and 22' of their peripheral edges 19 19' are essentially in the same plane as that of the membranes 14 14' over the peaks of the channels arranged in the basins 3, in order to avoid as far as possible creating pressure losses for the fluid circulating under pressure in contact with the membranes 14 and 14' which are located between two adjacent support plates 1. In order to do this, the length of the male ring 15 between its outer face 22 at the edge 19 and its face 43 at the other end of its cylindrical part 17, is essentially identical to the thickness of the support plate 1 covered by the membranes. The length of cylindrical part 18 of the female ring 16 is such that minimum clearance exists at 29 when the two rings 15 and 16 fix the membranes 14 and 14' in a leaktight manner on a support plate 1, as is shown in FIG. 3. The external diameter 23 of the cylindrical part 18 of the female ring 16 is essentially identical to the diameter of the orifice 2 2' or 2'' of the support plate 1, in order for this ring 16 to be able to center itself by sliding freely into the orifice. The internal diameter 24 of the female ring 16 terminates near the outer face 22' of the edge 19' with a bevelled edge 25. The external diameter 26 of the cylindrical part 17 of the male ring 15 is very slightly greater than the internal diameter 24 of the female ring 16, so that, when they are mounted on a support plate 1, it is necessary to exert a certain force, for example, to mount the rings 15 and 16 using a press. The male ring 15 has a peripheral lip 27 which, when it is mounted on the plate 1, is pressed down into the bevelled edge 25 of the female ring 16 and thus ensures that the rings 15 and 16 are locked to one another. This lip 27 can optionally be heat-sealed to the bevelled edge 25 of the female ring 16, either after it has been engaged or while it is being engaged. When the device according to the present invention is mounted in orifice 2 2' or 2'' of a support plate 1, the internal diameter 28 of the male ring 15 defines the diameter of the passage for the fluid to be treated.

Figure 4:
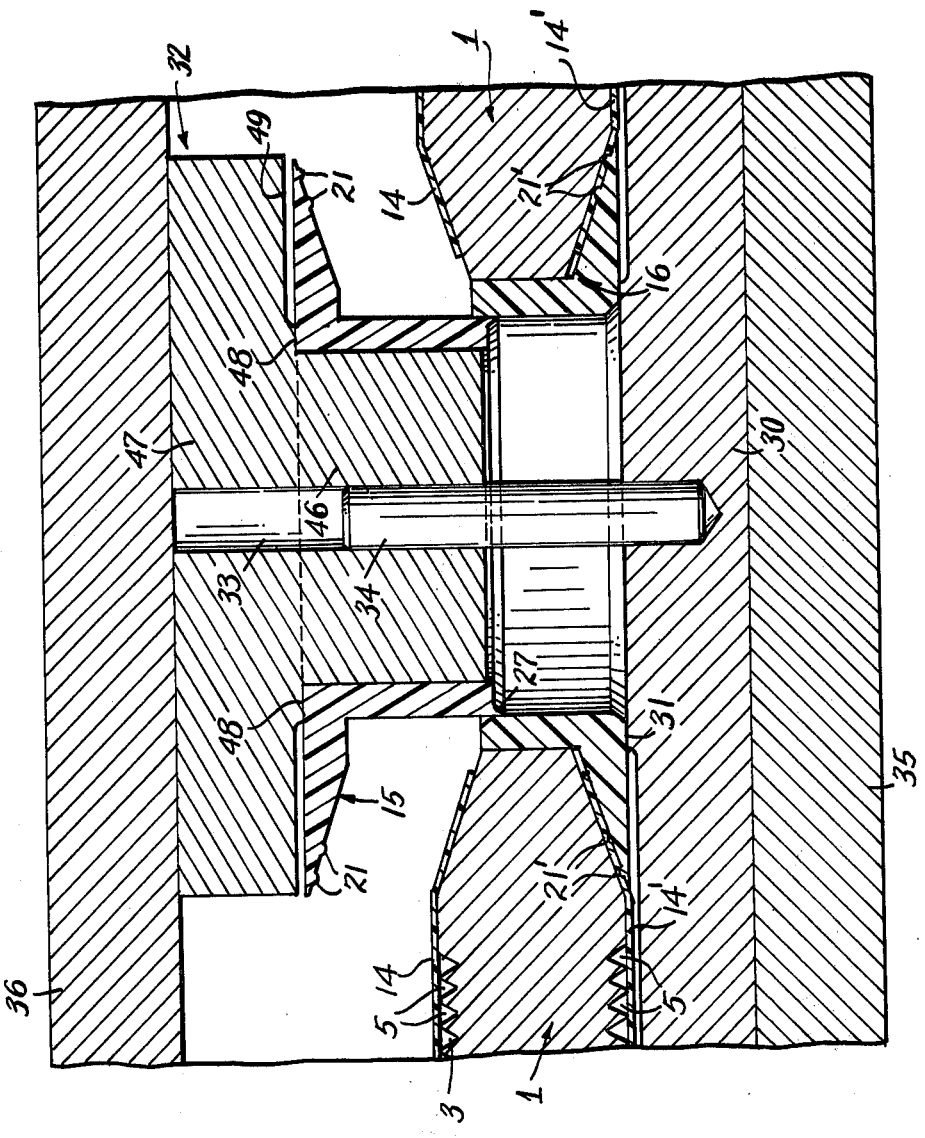
FIG. 4 shows a method of assembling a device according to the present invention.

The device, described and shown in FIGS. 3, 3A and 3B, is generally mounted on a support plate 1 by the following procedure. First, an auxiliary plate 30 is provided (see FIG. 4), the dimensions of which essentially correspond to those of the support plate 1 which it is desired to equip with the devices of the invention. According to the method of assembly now to be described, a plate is simultaneously equipped with all the devices required by its orifices. The auxiliary plate 30 comprises, at its periphery, means (not shown) for positioning the support plate 1, slight ridges 31 situated at the location of the orifices 2 of the support plate 1. These ridges 31 preferably have a circular shape and are substantially the same size as the outer face 23 of the cylindrical part of a female ring 16. Female rings 16 are arranged on each of the ridges 31, and a membrane 14′, which has been cut beforehand so that it rests on the inner face 20′ of the peripheral edge 19′ of each female ring 16, is then positioned as shown. The support plate 1 is then placed on the auxiliary plate 30, as shown in FIG. 4, around the cylindrical part of each female ring 16. A membrane 14, which has been cut beforehand like the one positioned previously, is placed on the upper face of the support plate 1. A male ring 15 is then arranged as shown above each female ring 16. In the inner diameter 28 of this male ring, there is an element 32 having a central passage 33 which ensures the centering of the male ring 15 by means of a cylindrical axle 34 which is firmly fixed to the auxiliary plate 30. The element 32 comprises a cylindrical part 46 which is in the internal diameter 28 of the male ring 15 (as shown in FIG. 4), this cylindrical part 46 of the element 32 being fixed to another part 47, which is of larger, for example, and of cylindrical cross-section, and the face 49 of part 47 comprising a ridge 48 which rests on the outer face 22 of the peripheral edge 19 of the male ring 15. This ridge 48 is of cylindrical shape and of the same cross-section as that of the external diameter 26 of the male ring 15. For the final positioning of the devices of the invention, the assembly comprising auxiliary plate 30, support plate 1, rings 15 and 16, membranes 14 and 14′ and element 32 is then placed between the platens 35 and 36 of a press which, under the action of a predetermined force, forces the male rings 15 axially towards and into the female rings 16 until the ridges 21 and 21′ on the inner face 20 and 20′ of the edge 19 and 19′ of each ring 15 and 16 flatten the membranes 14 and 14′ in a leaktight manner against each face 11 of the flared portions of the support plate. At the end of the forward motion of each male ring 15, the lip 27 engages the ridge 31 of the auxiliary plate 30 and is thus into the bevelled edge 25 provided in the female ring 16. One can then remove the unit, described above, from the platens 35 and 36 of the press.

The membrane attaching device according to FIG. 3 has numerous advantages. These devices can be positioned simply, reliably and simultaneously on a support plate 1, as has been shown above in the method described by way of example, which can be entirely automatic. The devices 13 are generally made of rigid macromolecular material and they are advantageously made of injection-molded material. This makes it possible optionally to produce the support plates 1 and the rings 15 and 16 from the same material. The fact that the outer faces 22 and 22′ of the edges 19 and 19′ of each ring 15 and 16 are essentially in the same plane as that of the membranes 14 and 14′ over the basins 3 entails minimum pressure losses in the fluid to be treated under pressure at these points. This device offers the additional advantage that it does not have any zone or any points which can be poorly irrigated by the fluid to be treated, which circulates under pressure in contact therewith, that is to say more exactly in contact with the outer faces 22 and 22′ of the edges 19 and 19′ and in contact with the cylindrical inner wall 28 of the male ring 15. This absence of any point or zone which can be poorly irrigated by the fluid to be treated is particularly advantageous, especially in the case where this fluid is an alimentary or biological liquid such as, for example, milk. In addition, this makes it possible to clean the apparatus, which comprises several support plates, safely without having to dismount the apparatus in order to wash each support plate individually. In order to wash the membranes of the support plates (for example, after prolonged use of the apparatus), it suffices to cause a washing liquid to circulate directly inside the apparatus.

A further advantage of the device according to the present invention results from the fact that it can compensate, in the course of time, for the possible creep of the membranes, and that it is thus capable of ensuring constant leaktightness by means of the elastic deformation which the edges 19 and 19′ of the rings can undergo when their outer peripheries are brought, under pressure, into contact with the membranes during the mounting of each device on a support plate.

By way of non-limiting examples of macromolecular materials which can be employed for the production of the rings 15 and 16, there may be mentioned NORYL 731 S (based on polyphenylene oxide) marketed by General Electric Co. UDEL P 1710 (based on polysulphone) marketed by UNION CARBIDE Co. and the polyamide "TECHNYL" marketed by RHONE-POULENC CO.

The device according to FIG. 3 can form the subject of numerous variants. By way of example, the device can comprise two rings 15 and 16, one of which fits into the other by simply sliding instead of being fitted by force, as was the case above. In addition, once these two rings have been mounted on a support plate 1, they can be subjected to heat-sealing of the lip 27 when deflected or bent into the bevelled edge 25 of the female ring 16.

Figure 5:
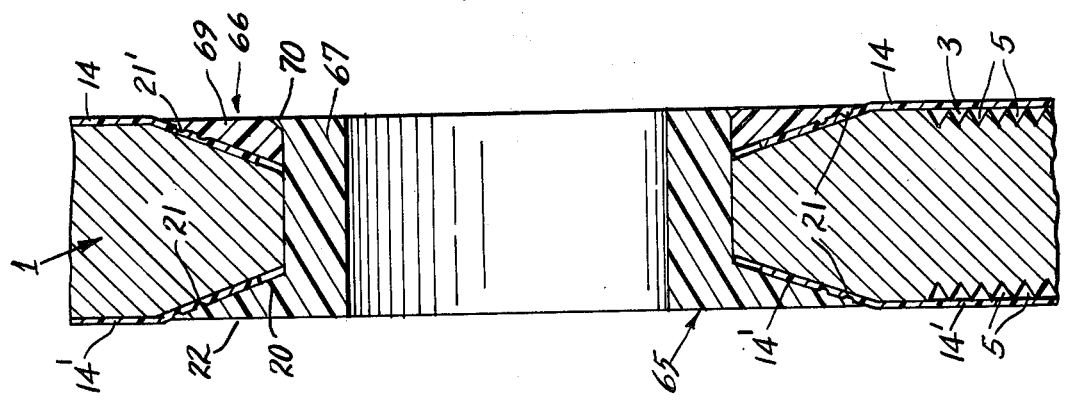

FIG. 5 shows another embodiment of a device embodying the present invention. Similar to that shown in FIG. 3, this device comprises a male ring 55 and a female ring 56, one of which is fitted into the other under the action of a certain pressure, but both the outer face of the male ring 55 and the inner face of the female ring 56 are formed with circular channels 37 perpendicular to the longitudinal axis of the faces. These channels 37 ensure that the rings 55 and 56 are locked together after they have been positioned on a support plate, and they additionally ensure a leaktight connection between the rings, which eliminates any possibility of infiltration of the pressurized fluid between the two rings. The device according to FIG. 5, in the same way as that according to FIG. 3, can, of course, comprise, on the male ring 55, a peripheral lip which can be pressed down into a bevelled edge provided on the female ring 56, it being furthermore possible for this lip to be heat-sealed to the female ring 56 while it is being engaged or after it has been engaged. By way of additional secureness in the leaktight securing of the rings to one another, a small amount of glue may be placed in at least a few channels 37 before fitting the rings 15 and 16 together under pressure.

FIG. 6 shows, by way of a variant, another embodiment of a device 13 embodying the present invention. This embodiment does not include male ring and female ring because the two rings 38 and 39 of this embodiment are essentially identical as to their external dimensions. Thus, the two rings 38 and 39 both have edges which may be identical to those of the device according to FIG. 3, are each in contact with the cylindrical part of the orifice of the plate 1 at the outer face of their cylindrical part. Once the device has been mounted on a support plate 1, the fluid to be treated circulates in contact with the cylindrical inner face 40 of each ring 38 and 39. The two rings 38 and 39 are fixed to one another, for example, by means of four locking-studs 41 which are spaced 90 degrees apart around the longitudinal axis of the ring 39, and the ends of which are pressed down into the corresponding slots 42 of the ring 38 which has four openings for the passage of the locking-studs 41. After having been pressed down into the slots, the studs 41 can be heat-welded to the outer face of the ring 38. At least one thin peripheral gasket 44 is advantageously provided on one of the rings 38 or 39 in order to ensure leaktightness between them.

FIG. 7 shows a further embodiment of the present invention, comprising two rings 38 and 39 which are essentially identical and are fixed to one another, when they are mounted on a support plate 1, by means of collar 45 provided in one of the rings on the face of its cylindrical part which is near the corresponding face of the other ring. This collar 45, for example, made of copper, is heated by high-frequency induction while the two rings 38 and 39 are pressed against one another. This collar 45 causes local melting, near the collar, of the material forming the rings and thus welds them together. It suffices to allow cooling to take place, while maintaining a sufficient pressure to enable the ridges 21 of the rings 38 and 39 to thoroughly flatten the membranes 14 and 14' against the faces 11 of the flared portion of the support plate 1.

FIG. 8 shows another embodiment of a device according to the present invention, for the leaktight securing of semipermeable membranes to a support plate. In this embodiment, the peripheral edge 69 of the female ring 66 is directly on the outer face of the cylindrical part 67 of the male ring 65. These two rings 65 and 66 are mounted one inside the other by force and the male ring comprises a lip 70 which can be pressed down when the two rings are assembled, as has been described for the device according to FIG. 3. Although the devices for the leaktight securement of membranes, according to the present invention, are preferably of circular cross-section and have been described and shown above as having such a shape, it must, however, be pointed out that the rings can optionally be of ellipsoidal cross-section or of square or rectangular cross-section with rounded corners, if the corresponding orifice 2 of the support plate 1 has this shape.

EXAMPLE

A support plate 1 such as that shown in FIGS. 1 and 2, having two orifices 2 at each of its ends, is equipped with devices 13 according to FIG. 3. This support plate 1 has a thickness of 5.5 mm and the diameter of its passage orifices 2 is 42 mm. The membranes used, which are based on sulphonated polysulphone, are marketed by RHONE-POULENC CO. under the reference IRIS 3022. They have a thickness of approxiamtely 0.2 mm; they are cut on the outside so as to essentially correspond to the contour of the groove 9 of the support plate 1 and they are cut on the inside to a diameter of 43 mm, the latter cutaway sections being opposite each passage orifice 2 on the support plate 1. The procedure followed for positioning the devices 13 and the membranes 14 is that indicated in the description and shown in FIG. 4. The male ring 15 and the female ring 16 are made of UDEL P 1710 (based on polysulphone), marketed by UNION CARBIDE CO. and are formed by injection molding. The diameter of the outer face 23 of the cylindrical part 18 of the female ring is 41.8 mm. The diameter of the inner face 24 of the female ring 16 is 38 mm. The length of the female ring 16 is 3.7 mm and the bevelled edge 25 is 0.5 mm deep and angled at 45 degrees. The inner face 28 of the male ring 15 has a diameter of 34 mm, while the outer face 26 of its cylindrical part 17 has a diameter of 38.4 mm. The length of the male ring 15 is 5.9 mm excluding the length of its peripheral lip 27 which is 0.8 mm and angled at 45 degrees. The two rings 15 and 16 each have a peripheral edge 19 having a diameter of 52 mm and a height of approximately 2.2 mm. The slope of the internal face 20 of the edges of each male ring 15 and female ring 16 forms an angle of 20 degrees with a plane perpendicular to their longitudinal axis A, while the slope of each face 11 of each flared portion of a support plate 1 makes an angle of 21 degrees with a plane perpendicular to the longitudinal axis B of an orifice 2. The inner face 20 of the edge 19 of each ring 15 and 16 has two peripheral ridges 21 which are concentric with the axis of the ring in question, these ridges 21 are spaced 1.5 mm apart, project from each face by 0.2 mm and have a rounded shape. A force of 1,000 kg must be applied in order to position a device 13 on a support plate 1.

An apparatus comprising a certain number of support plates 1, each equipped with membranes and securing devices 13 described above, has been used for the ultrafiltration of milk under a pressure of 4 bars and at temperatures of between 4 and 60° C. After five experiments each lasting 8 hours, it could be seen that no milk had passed into the devices 13 and, after they had been dismounted, it could be shown for each of them that there was no trace of milk on the faces 20, 23, 26 and 29 of the rings 15 and 16.

We claim:

1. A device for the leaktight securing of semi-permeable membranes to opposite faces and around at least one orifice in a support plate, said orifice having a flared surface portion at the periphery of each of of its ends at opposite faces of said support plate, the said device comprising two rings extending into said orifice from opposite ends thereof, the rings having flared surfaces which mate with the flared surface portions of the orifice peripheries and which press the edges of said membranes sealingly against said orifice periphery surface portions on the sides of said support plate, at least one of said rings having a lip thereon sealingly secured to the other ring at said lip to maintain sealing pressure on said membranes.

2. A device according to claim 1, wherein said flared surfaces of said rings have oblique surfaces facing said flared surface portions and wherein the angle between said oblique surface of each ring and a plane perpendicular to the axis of the ring in question is less than the angle between the flared surface portion of the corresponding flared portion of the support plate and a plane perpendicular to the axis of the orifice.

3. A device according to claim 2, wherein the difference in angle between the oblique surface of each ring and the corresponding flared portion of the support plate is between 0.5 and 5 degrees.

4. A device according to claim 3, wherein the said difference in angle is between 1 and 3 degrees.

5. A device according to claim 1, wherein at least one peripheral ridge is provided on each flared surface of said rings pressing the membrane in a leaktight manner onto the corresponding flared surface portion of the support plate.

6. A device according to claim 5, characterized in that the peripheral ridge is of the "thin continuous rib" type.

7. A device according to claim 1, wherein said orifice and each ring is of circular cross-section.

8. A device according to claim 1, wherein the distance between the outer faces of the two rings is substantially equal to the thickness of the support plate covered by the membranes on each of its faces.

9. A device according to claim 1, wherein the two rings are approximately circular and each has a cylindrical part extending into said orifice.

10. A device according to claim 1, wherein the two rings have approximately the same dimensions.

11. A device according to claim 1, wherein the two rings are fixed to one another by means of locking-studs which are provided on one ring and passed through the other ring.

12. A device according to claim 9, wherein the two rings are fixed to one another by means of said lip provided in one of the rings on the end of its cylindrical part which is near the corresponding face of the other ring, this collar being momentarily heated in order to ensure that the material forming the rings melts near the collar, and being cooled in order to make it possible for the two rings to weld to one another.

13. A device according to claim 1, wherein said rings comprise a male ring and a female ring, one of which is fitted into the other.

14. A device according to claim 13, characterized in that the rings are locked together by means of a lip, on the male ring, which is pressed against a bevelled edge on the female ring.

15. A device according to claim 14 wherein the said lip is heat-sealed to the female ring.

16. A device according to claim 13, wherein the rings are provided with interlocking circular channels located in planes perpendicular to the longitudinal axis of the rings and on the outer face of the male ring and on the inner face of the female ring.

17. A device according to claim 1, wherein said rings include a male ring having a length which is approximately equal to the thickness of the support plate plus that of the membranes covering the plate.

18. A device according to claim 1, wherein the rings are made of macromolecular material.

19. An apparatus for separating fluids which comprises, plates for supporting semi-permeable membranes and having aligned orifices, two membranes being secured leaktight on each face and around each orifice by means of a securing device according to claim 1.

* * * * *